Jan. 31, 1967 M. J. PERESADA 3,301,240
HYDRAULIC VALVE LIFTER
Filed July 2, 1965 2 Sheets-Sheet 1

INVENTOR
MIROSLAW J. PERESADA
BY Maybee & Legris
ATTORNEYS

Jan. 31, 1967    M. J. PERESADA    3,301,240
HYDRAULIC VALVE LIFTER
Filed July 2, 1965    2 Sheets-Sheet 2

INVENTOR.
MIROSLAW J. PERESADA
BY~ Maybee & Legris
ATTORNEYS

United States Patent Office 3,301,240
Patented Jan. 31, 1967

3,301,240
HYDRAULIC VALVE LIFTER
Miroslaw J. Peresada, 107 Wright Ave.,
Toronto, Ontario, Canada
Filed July 2, 1965, Ser. No. 473,552
Claims priority, application Canada, June 3, 1965,
932,363
8 Claims. (Cl. 123—90)

This application is a continuation-in-part of my earlier United States patent application No. 372,619, filed June 4, 1964, now abandoned.

This invention relates in general to hydraulic valve lifters for use in internal combustion engines, and in particular to the lubrication difficulties to which hydraulic valve lifters are subject.

Hydraulic valve lifters consist essentially of two concentric cylindrical pistons, one fitting snugly but slidably within the other, and they function primarily to cushion push-rods against high shock and acceleration forces due to cam rotation. The "cushion" effect is achieved by virtue of the slight but sufficient compressibility of a quantity of oil contained within the outer piston and ahead of the inner piston. Ideally, there should be no leakage of this contained oil during its compression. Such a condition, however, would require that, at the interface between the pistons, which is where the oil escapes, the tolerance be virtually zero. But with such a small tolerance, there would be no lubrication, expansion and contraction due to heat would cause the pistons to seize, and the usefulness of the hydraulic valve lifter would be destroyed.

A very delicate compromise has hitherto been struck to achieve the very minimum tolerance consistent with lubrication. However, because of thermal contraction and expansion, as well as the change of oil viscosity with heat, seizure of the pistons is still a major problem in the art.

It is the object of this invention to provide a hydraulic valve lifter in which very small inter-piston tolerances are permitted, reducing leakage of the "cushion" oil through the piston interface to a minimum, while complete and continual lubrication of the interface is assured.

Figure 1:
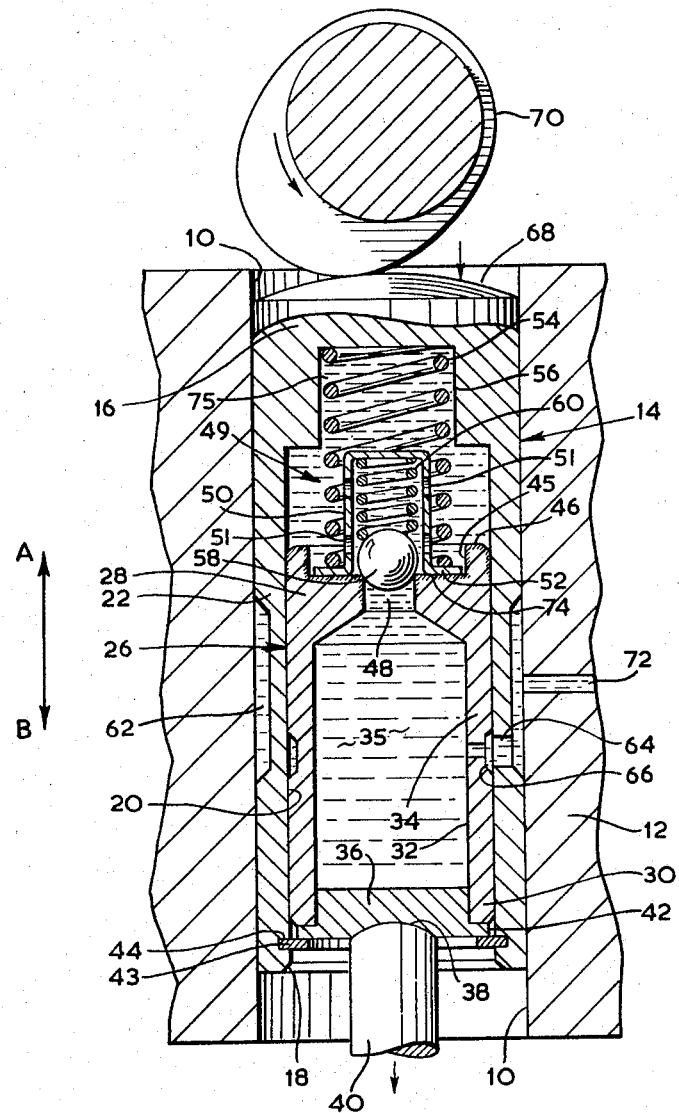
Figure 2:
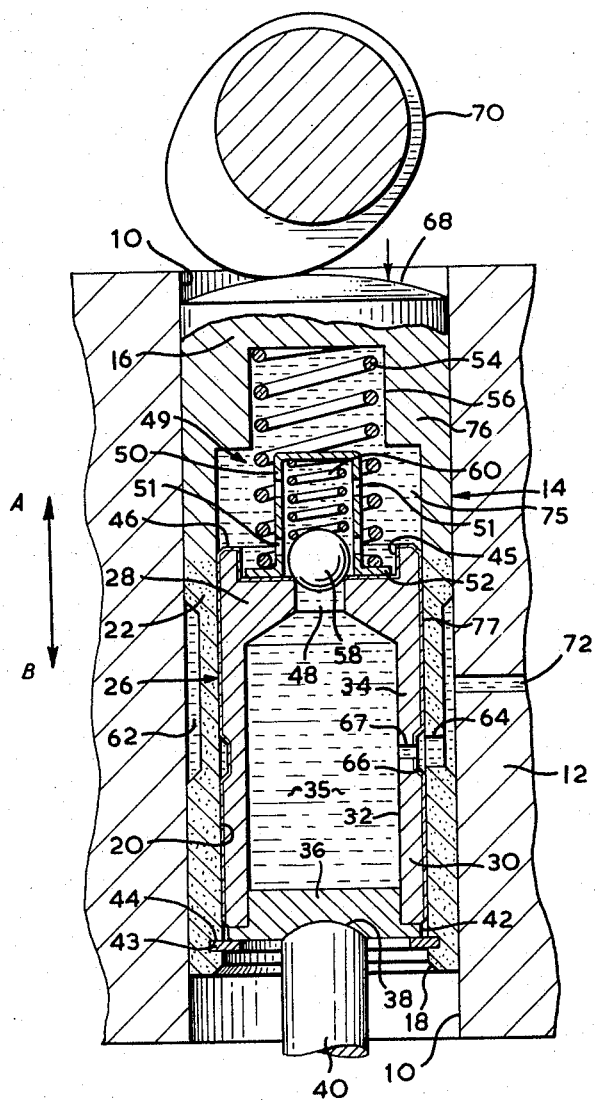

Two embodiments of this invention are illustrated in the accompanying drawings, in which like numerals denote like parts throughout the several views, and in which:

FIG. 1 is a longitudinal sectional view of a first embodiment of a hydraulic valve lifter; and FIG. 2 is a longitudinal sectional view of a second embodiment of a hydraulic valve lifter.

This invention contemplates the fabrication of at least one of the pistons from porous, sintered metal, preferably steel, such that during operation lubricating oil can continually "sweat" through the porous metal to the interface between the pistons. Due to this construction, constant lubrication is assured regardless of the tolerance between the pistons.

Although the use of sintered metal solves one problem, it at the same time introduces another. In order for a hydraulic valve lifter with a sintered piston or pistons to be operable, a way had to be found to prevent the "quantity" of oil intended to undergo compression from passing through the sintered wall of whichever piston is so constructed. It was found that by impregnating with a sealant at least those portions of the sintered piston or pistons which define the cavity containing the "quantity" of oil to be compressed, a proper seal was regained.

It should be pointed out that the usual advantages attendant upon the use of sintered as against solid metals assume a particular importance in this application. Present-day methods of manufacturing hydraulic valve lifters involved either machining the pistons from solid stock or first stamping billets to approximate size and subsequently machining. With sintered metal, however, the initial pressing of the pistons does not involve high forces, permitting more accurate tolerances in the pressing. Furthermore, any necessary machining of the sintered pistons benefits from the higher machinability of sintered as against solid metals.

The alternatives comprehended within this invention are, (1) the fabrication of only one of the two pistons from sintered metal, the other being of solid metal construction, and (2) the fabrication of both pistons from sintered metal. Either alternative requires the appropriate and selective use of sealant to achieve the desired result. As there is a difference between the coefficient of thermal expansion of sintered as against solid steel, the latter method seeks to reduce to a minimum the effect of heat on the tolerance between the pistons. The two embodiments to be described below are (a) a porous inner piston through which lubricating oil flows to the interface and an outer piston of either solid or sealant-impregnated sintered construction, and (b) a porous outer piston through which lubricating oil flows to the interface and an inner piston of solid or sealant-impregnated sintered construction.

Firstly, the components common to both embodiments will be described, for which reference may be had to FIGURE 2. The numeral 10 refers to an operating bore in an engine block 12. Seated slidably within the bore 10 is a cylindrical outer piston 14, having a closed forward end 16 and an open rearward end 18. The outer piston 14 itself has a cylindrical bore 20 which extends axially and forwardly into the outer piston 14 from the open rearward end 18, so that the outer piston 14 has a cylindrical side wall 22 extending rearwardly from its forward end 16.

Seated snugly but slidably within the bore 20 is a cylindrical inner piston 26, having a forward end 28 adjacent the closed forward end 16 of the outer piston 14, and an open rearward end 30. The inner piston 26 has a cylindrical bore 32 which extends axially and forwardly into the inner piston 26 from the open rearward end 30, so that the inner piston 26 has a cylindrical side wall 34 extending rearwardly from its forward end 28, defining a cavity 35 in the inner piston 26.

The open rearward end 30 of the inner piston 26 is closed by a cap 36 having a recess 38 in which is seated one end of a push-rod 40. The cap 36 has a peripheral, circular flange 42 which abuts against the rearward end 30 of the inner piston 26. The outside diameter of the circular flange 42 is not greater than the outside diameter of the inner piston 26. A split-ring spring retainer 43 clips into place within an annular gallery 44 in the inner surface of the rearward end 18 of the outer piston 14. The inside diameter of the spring retainer 43 is less than the outside diameter of the circular flange 42, so that the spring retainer constitutes a rearward limit to the movement of the inner piston 26 relative to the outer piston 14.

The forward end 28 of the inner piston 26 has a recess 45 in its forward face 46 and a central cylindrical aperture 48. The aperture 48 has associated with it a one-way valve shown generally at 49. A cup-like member 50 has apertures 51 and a radial flange 52. It is held within the recess 45 by a first helical compression spring 54 whose rearward end pins the flange 52 into the recess 45 and whose forward end seats within a recess 56 in the forward end 16 of the outer piston 14. A metal sphere 58 whose diameter is somewhat greater than the diameter of the aperture 48 is urged into the aperture 48 by the rearward end of a second coil compression spring 60 whose forward end seats within the cup-like member 50. The first helical compression spring 54, besides holding the cup-like member 50 in position, also functions to urge the inner piston 26 rearwardly so that the flange 42 of the cap 36 abuts against the spring retainer 43.

The outer piston 14 has a first exterior gallery (circumferential recess) 62 which, by way of an aperture 64, communicates with a second gallery 66 on the exterior surface of the inner piston 26. An aperture 67 in the inner piston 26 communicates the gallery 66 with the cavity 35.

The forward face 68 of the outer piston 16 has, when new, an outwardly convex curvature of 50 inches radius. In the drawing, the curvature has been accentuated for purposes of illustration. The outer piston 14 is caused to reciprocate within the operating bore 10 by a rotating cam 70, geared to the crank shaft (not shown) of the engine in known manner.

Oil, for both operating and lubricating purposes, is delivered under pressure into the operating bore 10 through an oil line 72 in the block 12.

The oil line 72 opens into the operating bore 10 at a location which remains within the area of the first exterior gallery 62 when the hydraulic valve lifter is reciprocating under the urging of the cam 70.

It is desirable to permit the inner piston 26 and the outer piston 14 to rotate freely about their axes independently of each other and of the block 12. Because of the galleries 62 and 66, a clear passage is maintained between the oil line 72 and the cavity 35, irrespective of the relative radial orientations of the two pistons.

This invention contemplates the sintered steel fabrication of the inner piston, the outer piston, or both pistons.

In FIG. 1 is shown the first embodiment, wherein the inner piston 26 is made of sintered steel, and the outer piston 14 is of either solid or sintered steel. In this embodiment, the oil feed to the interface between the pistons is by way of the wall of the inner piston 26, so that the outer piston, if it is of sintered steel, should be impregnated throughout with a sealant to make it impervious to fluid flow. The advantage that accrues from a sintered steel construction for both pistons has to do, as discussed above, with reducing the effects of heat on the inter-piston tolerance.

The forward face 46 and the recess 45 of the forward end 28 of the inner piston 26 is also impregnated with a sealant over the area 74 (shown by shadelines). The sealant 74 ensures that fluid flow (oil flow) through the forward end 28 of the inner piston between the cavity 35 and the forward end 75 of the cylindrical bore 20 in the outer piston 14 is possible only by way of the central aperture 48.

When the sealant 74 has been applied, the operation of the one-way valve 49 is such as to permit oil to flow through the aperture 48 only in the direction from the cavity 35 to the forward end 75.

In FIG. 2 is shown the second embodiment, wherein the outer piston 14 is made of sintered steel, and the inner piston 26 is of either solid or sintered steel. In this embodiment, the oil feed to the interface between the pistons is by way of the wall 22 of the outer piston 14, so that the inner piston should be impervious to fluid flow. With the cylindrical rearward portion of the outer piston 14 of sintered steel pervious to fluid flow, constant lubrication of the whole interface between the inner and the outer piston is achieved by the pressurized oil in the gallery 62 passing inwardly through the cylindrical side wall 22 (cross-hatched and shaded portion) to the interface. It is necessary, however, to render impervious to fluid flow the forward portion of the outer piston 14, that is, the portion between the forward end 16 of the outer piston (including the forward wall) and the forward end 28 of the inner piston 26. In this embodiment it is contemplated to impregnate the portion of the outer piston 14 ahead of the inner piston 26 with a sealant to make it impervious, although other means are possible, such as compressing the forward end by pressure or by a blow. The sealant 76 in the outer piston 14 is shown by crosshatching alone.

The inner piston 26 is also preferably fabricated of sintered steel. It is then wholly impregnated with a sealant and subsequently hard-chrome plated over its exterior surface as at 77. It is not absolutely necessary to hard-chrome plate the inner piston 26, but it is advantageous to do so, because it increases the sliding properties of the inner with respect to the outer piston, and as well appears to reduce the likelihood of rusting or other chemical changes occurring between the cylinders during storage before installation.

When the two pistons have been prepared in the above manner, the operation of the one-way valve 49 is such as to permit oil to flow through the aperture 48 only in the direction from the cavity 35 to the forward end 75 of the cylindrical bore 20 in the outer piston 14. Oil can escape from the forward end 75 only by very slowly seeping along the interface between the two pistons. Such seepage is reduced in the present invention, however, because of the close tolerances permitted by the constant lubrication along the interface.

In operation, the oil pressure in the cavity 35 remains substantially constant, since a clear passage is maintained between the cavity 35 and the oil line 72, the pressure in which may be assumed to be unvarying.

The push-rod 40 is biassed in the direction A by springs associated with the valve (not shown) which is being operated. Because of this biassing, the hydraulic valve lifter is kept in contact with the cam 70 as the latter rotates.

When the hydraulic valve lifter is moving in the direction A, the first helical compression spring 54 is strong enough to force the inner piston 26 to its furthest rearward position; that is the position as shown in the figures. If the oil pressure in the forward end 75 is less than the oil pressure in the cavity 35 by an amount exceeding a certain minimum determined by the strength of the second helical compression spring 60, oil will, during movement of the lifter in the A-direction, flow through the one-way valve 49 from the cavity 35 into the forward end 75.

When the hydraulic valve lifter is moving in the direction B, the push-rod 40 bears against the cap 36 with considerably greater force than during movement in the direction A. Under this increased force, the inner piston 26 moves forwardly with respect to the outer piston 14, compressing both the first helical compression spring 54 and the oil in the forward end 75. The oil in the forward end 75 cannot quickly escape into the cavity 35 because of the one-way valve 49. The compressibility of the oil is sufficient to give to the push-rod 40 the desired "cushion effect" for which the hydraulic valve lifter is designed.

During movement in the B-direction, some of the oil in the forward end 75 may seep into the cavity 35 by way of the cylindrical interface between the pistons, but any escaped oil is replaced during the next successive movement in the A-direction, as explained above.

Either of the two embodiments will permit oil to "sweat" continuously into the interface between the two pistons, greately reducing the danger of the pistons freezing or locking together, and permitting close inter-piston tolerances.

What I claim as my invention is:

1. A hydraulic valve lifter for use in internal combustion engines comprising a sintered cylindrical outer piston having a closed forward end, an open rearward end from which a cylindrical bore extends forwardly into the outer piston, a cylindrical inner piston fitting snugly but slidably within said cylindrical bore, the inner piston having a forward end adjacent the closed forward end of the outer piston and a rearwardly extending cylindrical side wall, the inner piston being of sintered metal construction and impregnated substantially throughout with a sealant in order to make it impervious to fluid flow, the outer piston being made impervious to fluid flow between its closed forward end and the forward end of the inner piston, the remainder of the outer piston being pervious to fluid flow.

2. A hydraulic valve lifter as claimed in claim 1 in which the portion of the outer piston between its closed forward end and the forward end of the inner piston is impervious to fluid flow by virtue of impregnation with a sealant.

3. A hydraulic valve lifter as claimed in claim 1 in which the sintered, sealed inner piston is hard-chrome plated on its exterior.

4. A hydraulic valve lifter as claimed in claim 1, in which the sintered sealed inner piston is hard-chrome plated on its exterior, and in which the forward end of the inner piston is closed except for a central aperture having associated with it a one-way valve so arranged that fluid flow through the forward end of the inner piston takes place only in the forward direction by way of said central aperture.

5. A hydraulic valve lifter for use in internal combustion engines comprising a cylindrical outer piston having a closed forward end and an open rearward end from which open rearward end a cylindrical bore extends forwardly into the outer piston, the outer piston being constructed of sintered metal impregnated substantially throughout with a sealant in order to make the outer piston impervious to fluid flow, a cylindrical inner piston fitting snugly but slidably within said cylindrical bore, the inner piston having a forward end adjacent the closed forward end of the outer piston and a rearwardly extending cylindrical side wall, the forward end of the inner piston and the cylindrical side wall defining a cavity within the inner piston, the cylindrical side wall being of sintered metal construction pervious to fluid flow.

6. A hydraulic valve lifter for use in internal combustion engines comprising a cylindrical outer piston impervious to fluid flow having a closed forward end and an open rearward end from which open rearward end a cylindrical bore extends forwardly into the outer piston, a cylindrical inner piston of sintered metal construction fitting snugly but slidably within said cylindrical bore, the inner piston having a forward end adjacent the closed forward end of the outer piston and a rearwardly extending cylindrical side wall defining a cavity within the inner piston, the forward end of the inner piston being closed except for a central aperture having associated with it a one-way valve, at least a portion of the forward end of the inner piston being impregnated with a sealant such that fluid flow through the forward end of the inner piston between said cavity and said cylindrical bore is possible only by way of said central aperture.

7. A hydraulic valve lifter as claimed in claim 6 in which the cylindrical outer piston is constructed of sintered metal impregnated substantially throughout with a sealant in order to make the outer piston impervious to fluid flow.

8. A hydraulic valve lifter for use in internal combustion engines comprising a cylindrical outer piston having a closed forward end and an open rearward end from which open rearward end a cylindrical bore extends forwardly into the outer piston, a cylindrical inner piston fitting snugly but slidably within said cylindrical bore, the inner piston having a forward end adjacent the closed forward end of the outer piston and a rearwardly extending cylindrical side wall, the forward end of the inner piston and the cylindrical side wall defining a cavity within the inner piston, the cylindrical side wall of the inner piston being of sintered metal construction pervious to fluid flow, said forward end of the inner piston being of sintered metal integral with said rearwardly extending cylindrical side wall, and being closed except for a central aperture having associated with it a one-way valve, the forward end of the inner piston having a forward face which forward face is impregnated with a sealant such that fluid flow through the forward end of the inner piston between the cavity and said cylindrical bore is restricted to said central aperture.

References Cited by the Examiner

UNITED STATES PATENTS

| | | | |
|---|---|---|---|
| 2,564,109 | 8/1951 | Horowitz et al. | 184—18 X |
| 2,696,434 | 12/1954 | Bartlett | 184—18 X |
| 2,869,514 | 1/1959 | Gluss | 184—18 X |
| 2,907,304 | 10/1959 | Macks. | |
| 2,938,508 | 5/1960 | Papenguth | 123—90 |
| 3,001,609 | 9/1961 | Macks | 184—18 |
| 3,025,842 | 3/1962 | Van Slooten | 123—90 |
| 3,058,454 | 10/1962 | Concalves | 123—90 |
| 3,090,367 | 5/1963 | Ayres | 123—90 |
| 3,093,382 | 6/1963 | Macks | 277—27 |

MARK NEWMAN, *Primary Examiner.*

AL LAWRENCE SMITH, *Assistant Examiner.*